Dec. 9, 1969　　　M. GEBENDINGER　　　3,482,382
TREE CROP HARVESTER

Filed March 30, 1966　　　2 Sheets-Sheet 1

INVENTOR
MARIO GEBENDINGER

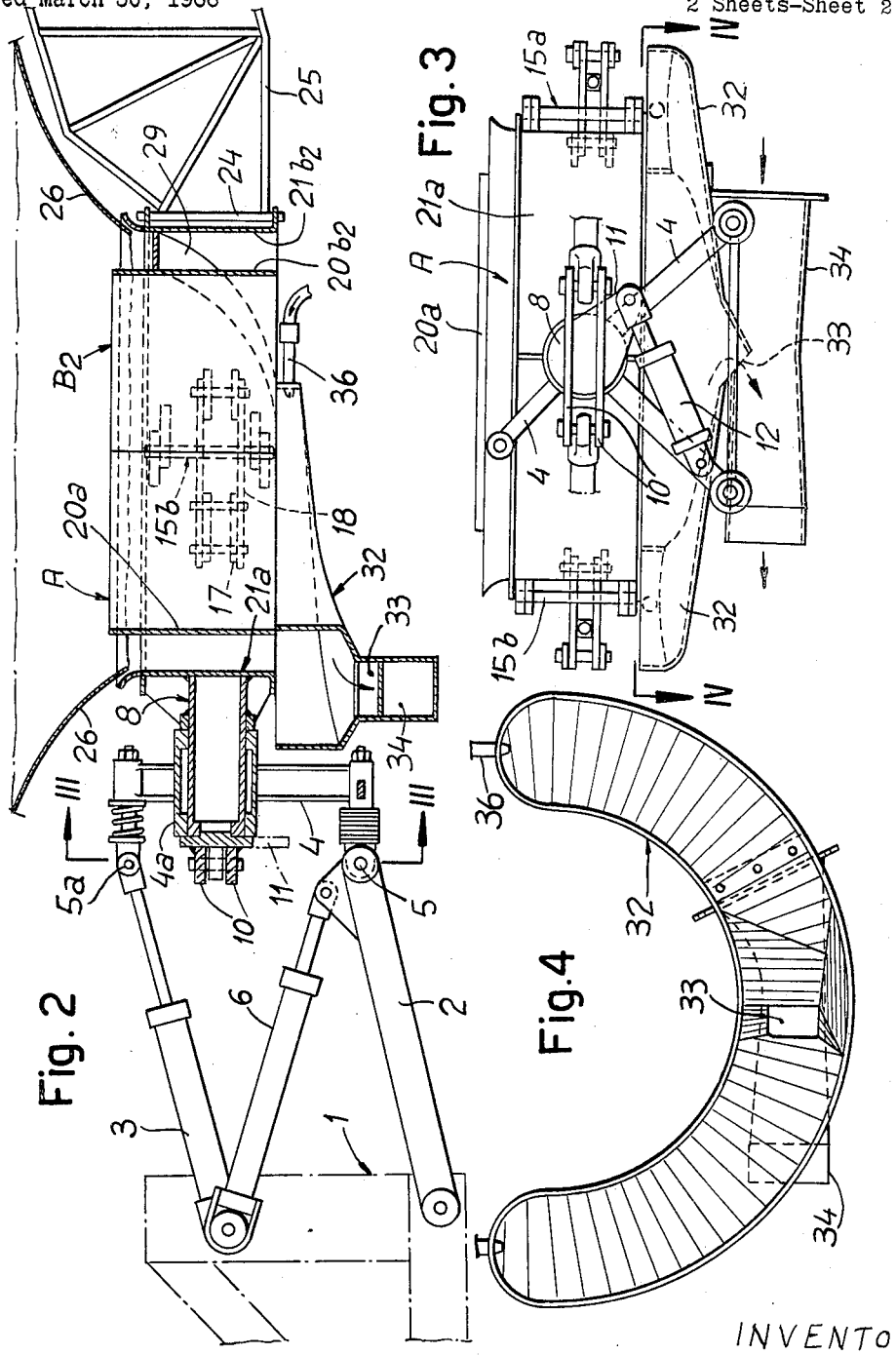

United States Patent Office 3,482,382
Patented Dec. 9, 1969

3,482,382
TREE CROP HARVESTER
Mario Gebendinger, Via S. Quirichino,
12/B-Marignolle, Florence, Italy
Filed Mar. 30, 1966, Ser. No. 538,774
Claims priority, application Italy, Dec. 22, 1965,
29,147/65
Int. Cl. A01g *19/06*
U.S. Cl. 56—329                         4 Claims

ABSTRACT OF THE DISCLOSURE

A tree harvesting device comprises a support member which is adapted to be carried on a vehicle. The support member carriers an annular collar on an adjustable linkage which may be shifted for positioning the collar around a tree trunk. The collar is made up of a half annular section which faces outwardly from the member carried by the support and two partial quarter sections which are pivotal at each end of the half annular section. Each of the sections carries a plurality of radially extending arms which become oriented substantially radially outwardly when the two quarter sections are enclosed around the far side of the tree. The arms support a covering which forms a catch surface for receiving produce from the tree. The catch surface is connected to feed into a chute or hopper having means for delivering the produce to a central location.

---

Figure 1:
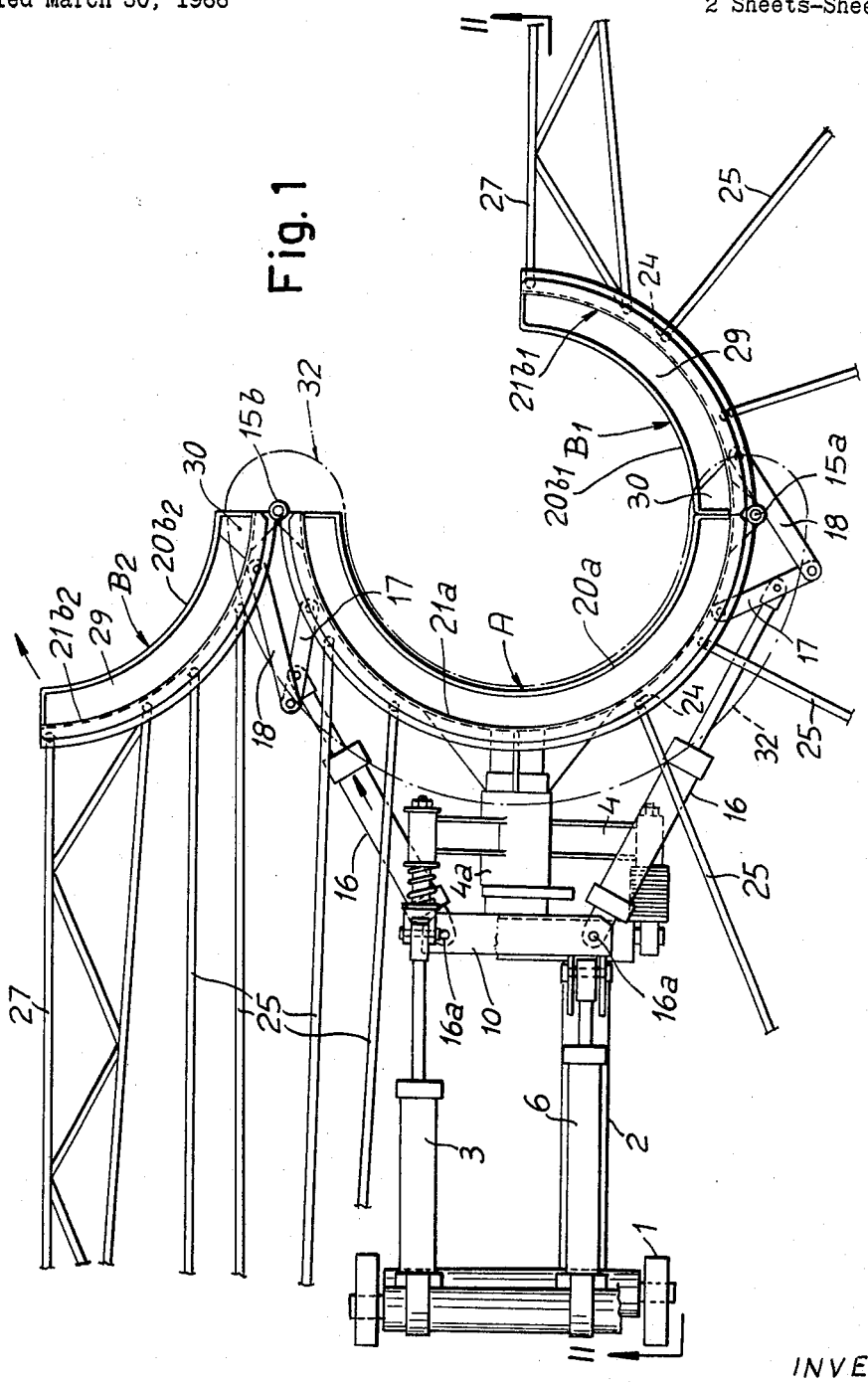

This invention relates in general to a harvesting device and in particular to a new and useful device for engaging around tree trunks, which is borne by a tractor or similar vehicle, and which comprises a collar with a plurality of sections carrying linked rods which form a funnel to be placed around the trunk of the tree from which olives or similar products may be obtained.

Advantageously the collar is provided, in its sections, with an inclined bottom gap towards which the collected produce is conveyed from the funnel in order to be discharged into a conveyor.

The collar includes a main half section which pivotally supports at each end an openable quarter section. The sections may comprise a hopper connected to receive collected products from channels defined around the collar spreadable sections. A pneumatic conduit, having a Venturi tube contraction to suck the olives or the like from the hopper lower portion, is connected to the hopper. Preferably also air pressure nozzles are located in the initial higher portion of the channels and/or over the discharge mouth of the hopper for directing the products into the conveying pneumatic conduit.

Accordingly, an object of the invention is to provide a device for collecting produce from a tree which includes means for engaging a rounded tree trunk and for collecting the produce which may fall from the tree by shaking the tree with the engaging means.

A further object of the invention is to provide a tree harvesting device which includes a collar formed with a fixed circular collar part with at least one pivotal part connected thereto which may be pivoted to close a complete circle around a tree trunk and which includes means for supporting the collar part from a device such as a vehicle permitting it to be extended or retracted or pivoted.

A further object of the invention is to provide a collar for engaging a tree trunk for the harvesting of produce and collecting of the produce therefrom which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawing:
FIG. 1 shows a plan view of a tree trunk engaging device constructed in accordance with the invention;
FIG. 2 shows a section taken along the line II—II of FIG. 1;
FIG. 3 shows a view in partial section taken along the line III—III of FIG. 2;
FIG. 4 shows a view from the line IV—IV of FIG. 3.

According to the drawing enclosed, 1 generally denotes a support—preferably projecting in front of the tractor or similar vehicle—for the tree harvesting device. Pairs of connecting rods 2 and 3 are linked with the support 1. The connecting rods 3 each comprises a cylinder-piston system, with a rod which is extensible. An obliquely extending support 4 is mounted by means of joints 5 and 5a on the connecting rods 2 and 3 to thus form an articulated quadrilateral support similar to an articulated parellelogram. The rods 2 and 3 are capable of imposing variations of inclination on the support 4 by extending and shortening the cylinder-piston connecting rods. An additional cylinder-piston system 6 is employed to deform the articulated quadrilateral. The support 4 forms with a sleeve member 4a a substantially horizontal and longitudinal seat to receive a collar supporting pivot 8. Rearwardly the pivot 8 has a pair of traverses 10 and an extension 11 connected to a cylinder-piston system 12 to control the angular orientations of pivot 8. (See FIG. 3.) Pivot 8 supports a substantially circular section A of the collar which will surround a tree trunk.

Two additional quarter collar sections $B_1$ and $B_2$ are symmetrically linked in 15a and 15b with the ends of section A. Two cylinder-piston systems 16, linked at 16a to the traverses 10, serve to control the collar opening and closing by acting on links 17 and 18 provided between the section A and each of sections $B_1$ and $B_2$. Although in FIG. 1 sections $B_1$ and $B_2$ and relative control members are represented the one in a closing position and the other in the opening position, it is advantageous that the controls operate simultaneously and symmetrically. A compulsory synchronism was renounced owing to the fact that, when a movable section meets with an obstacle, the other section keeps on moving avoiding overloads for the first, which might also be damaged.

The collar thus briefly described may be adjusted in a vertical plane at support 4 by control of the system 6 by action of system 3, and by action of system 12, while systems 16 control opening and closing of the collar.

The collar on the whole consists of an inner cylindrical wall and an outer upwardly funnel-flared cylindrical wall. The inner wall is denoted 20a in section A, and $20b_1$ and $20b_2$ in both sections $B_1$–$B_2$. The outer walls are denoted 21a for section A and $21b_1$ and $21b_2$ for section $B_1$ and $B_2$. Rods 25 are linked in 24 with the outer walls $21a$–$21b_1$–$21b_2$, and they are adapted to be arranged radially when the collar is closed and to support the cloth or other layer 26 which is stretched thereover to form a produce collecting umbrella. Arms 27 are rigidly borne by the ends of sections $B_1$ and $B_2$ and are arranged side by side when the collar is closed. The cloth is engaged over the arms 27 and is also engaged perimetrically at the ends of rods 25 and also continuously to the upper funnel lip of the walls $21a$–$21b_1$–$21b_2$. The layer of cloth is cut and sewn so that, when it is stretched, it develops like a funnel. The funnel shaping of cloth 26 will be such that the inclination increases more or less gradually from the periphery towards the center, so as to accelerate the fall of olives and to avoid their concentration towards the center. Cloth 26 discharges into the gap between the walls 20 and 21 of the collar.

The gap zone between the walls $20b_1$–$21b_1$ and $20b_2$–$21b_2$ has a bottom wall 29, on each of the sections $B_1$ and $B_2$, helicoidally shaped and inclined downwardly and towards the hinges 15a–15b. The walls 29 end adjacent to the hinges in openings 30 (see FIG. 1). Between the walls 20a and 21a there is not a bottom but only suitable vertical connecting diaphragms which do not intercept the free fall of fruit or other produce from the cloth 26. Produce falling onto the inclined surfaces 29 is discharged through openings 30.

A curved hopper 32 is connected under the openings 30 as shown in FIG. 1. This hopper therefore collects all the products which discharge into the circumferential gap formed by the collar, and conveys it to an inclined central opening 33. A length of a pneumatic conduit 34 extends under the center of the hopper 32. The conduit 34 is shaped like a Venturi tube having a narrow section 33 connected to hopper 32. The returning effect caused by the Venturi tube construction and by an air current directed through it as well as the inclination of opening 33 favour the return of drupes and other fruit gathering in the hopper 32, thus allowing pneumatic conveyance through suitable flexible conduits connected to the Venturi tube 34 and with the aid of an appropriate fan or aspirator.

In order to make the discharge of collected products easier, a blow air nozzle 36 may be provided, for instance at each of the less deep ends of hopper 32. This will also facilitate run-off of the material on the hopper inclined bottom. To the same purpose also a nozzle (not shown) might be provided to blow downwardly in the direction of the hopper and to cause a whirling movement to favour passage of the harvest through the opening 33.

While a specific embodiment of the invention has been shown and described in detail to illustrate the application of the inventive principles, it will be understood that the invention may be embodied otherwise without departing from such principles.

What I claim is:

1. A tree harvesting device comprising a support member adapted to be carried on a vehicle, an annular collar including a main section and at least one additional section pivotally connected to said main section and being pivotal inwardly to close the annular collar and outwardly to open the collar to permit it to be inserted around a tree trunk and closed, means pivotally supporting said collar on said support member permitting pivotal and extensible and retractible movement of said collar in respect to said support, means surrounding said collar forming a collecting surface for collecting produce which may be dropped by the tree, said collar comprising two concentric walls defining an annular gap, said collecting surface being oriented to direct articles which are collected thereon into the annular gap, said annular gap including an inclined wall for directing products spirally downwardly therein, a hopper connected at the lower end of the inclined wall for collecting the articles which have been dropped from the tree, and a pneumatic conduit connected to said hopper for directing the products which are collected in said hopper through said conduit.

2. A tree harvesting device comprising a support member adapted to be carried on a vehicle, an annular collar including a main section and at least one additional section pivotally connected to said main section and being pivotal inwardly to close the annular collar and outwardly to open the collar to permit it to be inserted around a tree trunk and closed, means pivotally supporting said collar on said support member permitting pivotal and extensible and retractible movement of said collar in respect to said support, means surrounding said collar forming a collecting surface for collecting produce which may be dropped by the tree, said collar comprising two concentric walls defining an annular gap, said collecting surface being oriented to direct articles which are collected thereon into the annular gap, said annular gap including an inclined wall for directing products spirally downwardly therein, a hopper connected at the lower end of the inclined wall for collecting the articles which have been dropped from the tree, and air nozzles being arranged adjacent said inclined wall for aiding in the direction of materials therealong to said hopper.

3. A tree harvesting device comprising a support member adapted to be carried on a vehicle, an annular collar including a main section and at least one additional section pivotally connected to said main section and being pivotal inwardly to close the annular collar and outwardly to open the collar to permit it to be inserted around a tree trunk and closed, means pivotally supporting said collar on said support member permitting pivotal and extensible and retractible movement of said collar in respect to said support, means surrounding said collar forming a collecting surface for collecting produce which may be dropped by the tree, a collar supporting member being formed at one end of said collar having a cross frame portion extending in substantially a vertical direction, first and second parallel linkages connected between said cross frame member and said support, and third linkage connected from the pivotal connection of one of said linkages on said support to the pivotal connection of the other of said linkages on said vertical member, two of said linkages comprising cylinder and piston combinations with a piston which is slideable relative to said cylinder for extending and retracting the linkage.

4. A tree harvesting device according to claim 3, including a member extending outwardly from the central portion of said collar at an angle therefrom, and a cylinder piston member connected to said support and to said angle member and including a piston slideable in respect to a cylinder for shifting said angle member for rotating said collar member about substantially horizontal axis.

References Cited

UNITED STATES PATENTS

| | | | |
|---|---|---|---|
| 492,952 | 3/1893 | Ball | 56—329 |
| 3,407,582 | 10/1968 | Poehlmann | 56—329 |
| 1,132,325 | 3/1915 | Fountain | 56—329 |
| 2,649,680 | 8/1953 | Brown | 56—329 |
| 3,105,346 | 10/1963 | Stanclift | 56—329 |
| 3,105,347 | 10/1963 | Anderson et al. | 56—329 |
| 3,164,943 | 1/1965 | Pearson | 56—329 |
| 3,240,004 | 3/1966 | Muller | 56—329 |
| 3,338,041 | 8/1967 | Arpin | 56—329 |

F. BARRY SHAY, Primary Examiner

P. A. RAZZANO, Assistant Examiner